United States Patent
Lemasson et al.

(10) Patent No.: US 8,163,431 B2
(45) Date of Patent: Apr. 24, 2012

(54) BIPOLAR PLATE FOR FUEL CELL COMPRISING A HOUSING FOR MEASURING CONNECTOR

(75) Inventors: Damien Lemasson, Villeurbanne (FR); Xavier Glipa, Gif sur Yvette (FR); Jean-Philippe Poirot-Crouvezier, Saint Georges de Commiers (FR); Pascal Schott, Villars de Lans (FR)

(73) Assignees: Peugeot Citroen Automobiles SA, Velizy Villacoublay (FR); Commissariat a l'Energie Atomique et Aux Energies Alternatives, Paris (FR)

( * ) Notice: Subject to any disclaimer, the term of this patent is extended or adjusted under 35 U.S.C. 154(b) by 668 days.

(21) Appl. No.: 11/993,849

(22) PCT Filed: Jun. 23, 2006

(86) PCT No.: PCT/FR2006/001461
§ 371 (c)(1),
(2), (4) Date: Mar. 20, 2008

(87) PCT Pub. No.: WO2007/003744
PCT Pub. Date: Jan. 11, 2007

(65) Prior Publication Data
US 2010/0151347 A1 Jun. 17, 2010

(30) Foreign Application Priority Data
Jun. 28, 2005 (FR) .................................. 05 06600

(51) Int. Cl.
*H01M 8/24* (2006.01)
*H01M 4/64* (2006.01)

(52) U.S. Cl. .................. 429/457; 429/517; 429/518
(58) Field of Classification Search .................. None
See application file for complete search history.

(56) References Cited

U.S. PATENT DOCUMENTS

| 6,410,176 | B1 | 6/2002 | Genc et al. | |
|---|---|---|---|---|
| 6,660,420 | B1 * | 12/2003 | Yoshida et al. | 429/509 |
| 6,790,552 | B2 * | 9/2004 | Kobayashi et al. | 429/469 |
| 2003/0072983 | A1 | 4/2003 | Kikuchi et al. | |
| 2003/0215678 | A1 | 11/2003 | Barton et al. | |
| 2004/0028969 | A1 * | 2/2004 | Aoto | 429/23 |

OTHER PUBLICATIONS

International Search Report mailed Nov. 16, 2006 in PCT/FR2006/001461.

* cited by examiner

*Primary Examiner* — Cynthia Lee
(74) *Attorney, Agent, or Firm* — Nicolas E. Seckel

(57) ABSTRACT

Bipolar plate for a fuel cell, of the type comprising a cathode bipolar half-plate and an anode bipolar half-plate which are secured to each other, each bipolar half-plate (1) being constituted by a plate which comprises, in the central portion thereof, an active zone (2) and, at the peripheral portion thereof, a plurality of cut-outs (5) which are intended to constitute at least two oxidant units, at least two fuel units and at least two heat-exchange fluid units, at least one bipolar half-plate (1) comprising at least one connection between a peripheral cut-out (5) and the active zone (2), and comprising, at the periphery thereof, at least one hollow housing (140) which is intended to receive a connector (141) for electrical measurement.

20 Claims, 2 Drawing Sheets

BIPOLAR PLATE FOR FUEL CELL COMPRISING A HOUSING FOR MEASURING CONNECTOR

Figure 1:
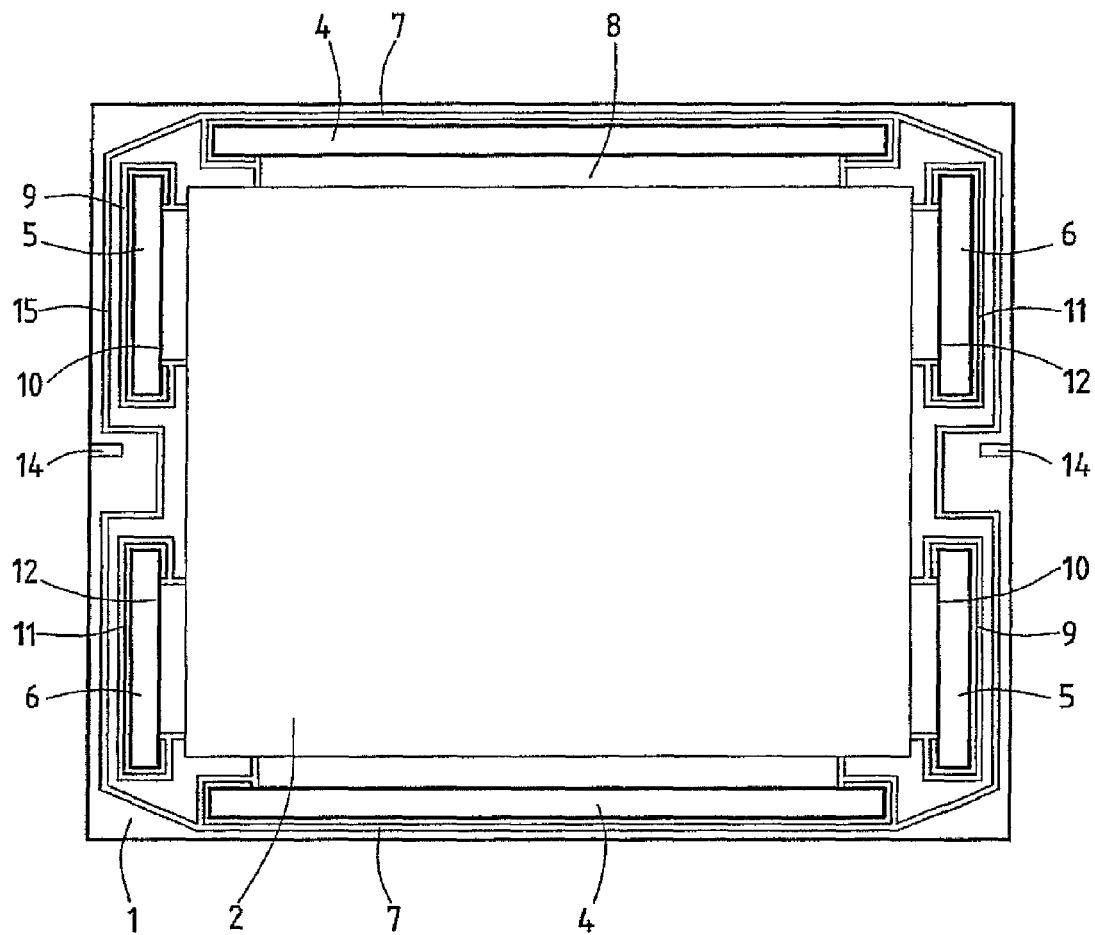

The present invention relates to a bipolar plate for a fuel cell of the type having a proton-exchange membrane. The bipolar plate is constituted by two bipolar half-plates which are secured to each other, each bipolar half-plate being constituted by a plate which is generally rectangular and which comprises, in the central portion thereof, an active zone and, at the peripheral portion thereof, a plurality of cut-outs which are intended to constitute fluid units, and ribs which are intended to provide sealing.

A fuel cell having a proton-exchange membrane is a device for producing electricity by means of an electrochemical reaction between a fuel, for example, a gas containing hydrogen, and an oxidant, for example, a gas containing oxygen, separated by a wall which is constituted by a solid electrolyte. In a device of this type, when the fuel is hydrogenous gas and the oxidant is oxygenous gas, the hydrogenous gas and the oxygenous gas react in order to form water whilst generating an electrical current which may be used for various applications.

Generally, a fuel cell is constituted by a stack of elementary cells which are each constituted by an electrode/membrane assembly which is inserted between two bipolar plates which comprise channels which are intended for the circulation of, on the one hand, the fuel and, on the other hand, the oxidant, and finally a heat-exchange fluid such as water. The electrode/membrane assembly is a multi-layer material which is known per se and which comprises a layer which is constituted by the membrane of solid electrolyte which is itself arranged between two active layers which constitute, on the one hand, a cathode and, on the other hand, an anode, which are themselves coated with two outer layers referred to as diffusion layers. The stack of elementary cells is retained in a state secured between two terminal plates which are flange-mounted by means of pins which extend from one terminal plate to the other and which extend through the stack of elementary cells.

Generally, bipolar plates are produced from materials which provide good properties in terms of resistance to corrosion and electrical conductivity. Bipolar plates are known, for example, which are produced from carbon-containing materials such as graphite, a polymer impregnated with graphite or flexible sheets of graphite, shaped by means of machining or moulding. Bipolar plates are also known which are formed from metal materials, such as alloys based on titanium, aluminium or based on iron. These bipolar plates which are produced from metal material are generally plates which are shaped by means of drawing or stamping. In bipolar plates which are produced from metal sheets which are shaped by means of drawing, the intake of fluids and the discharge of by-products are carried out in zones of the bipolar plate which are locally planar, which requires the use of a frame which has a suitable shape and which can also be used to provide peripheral sealing of the bipolar plate. This technique has the disadvantage of requiring, for the same bipolar plate, in addition to two bipolar half-plates, a complementary component which is intended to provide the joint between the two bipolar half-plates and bring about the supply and discharge of fluid and by-products. Bipolar plates which are relatively solid result.

Bipolar plates of this type also comprise, at the periphery thereof, lugs which extend outwards and which are intended to connect, using crocodile clips, for example, measuring devices. These lugs increase the spatial requirement of the bipolar plates and the production cost thereof.

The object of the present invention is to overcome these disadvantages by providing a bipolar plate which is produced from metal plates, which is lighter, smaller and more economical than known plates, whilst allowing measuring devices to be connected.

To this end, the invention relates to a bipolar plate for a fuel cell comprising a cathode bipolar half-plate and an anode bipolar half-plate which are secured to each other, each bipolar half-plate being constituted by a plate which comprises, in the central portion thereof, an active zone and, at the peripheral portion thereof, a plurality of cut-outs which are intended to constitute at least two oxidant fluid units, at least two fuel fluid units and at least two heat-exchange fluid units, at least one bipolar half-plate comprising at least one connection between a peripheral cut-out and the active zone, and comprising, at the periphery thereof, at least one hollow housing which is intended to receive a connector for electrical measurement.

A hollow housing may be constituted by at least one rib which protrudes towards the outer face of at least one bipolar half-plate and which extends from the periphery of the bipolar half-plate, without reaching either the active zone or the cut-outs which are intended to form fluid units.

Preferably, the hollow housing is constituted by two ribs which face each other and which are provided in each of the bipolar half-plates.

At least one bipolar half-plate may be a metal plate, for example, of stainless steel, and the ribs are produced, for example, by means of drawing or stamping.

At least one bipolar plate may also be produced from charged polymer, expanded graphite and the ribs may be produced by means of drawing, stamping or moulding.

The invention also relates to a fuel cell of the type comprising at least one cell which is constituted by a membrane/electrode assembly which comprises at least one bipolar plate.

Figure 2:
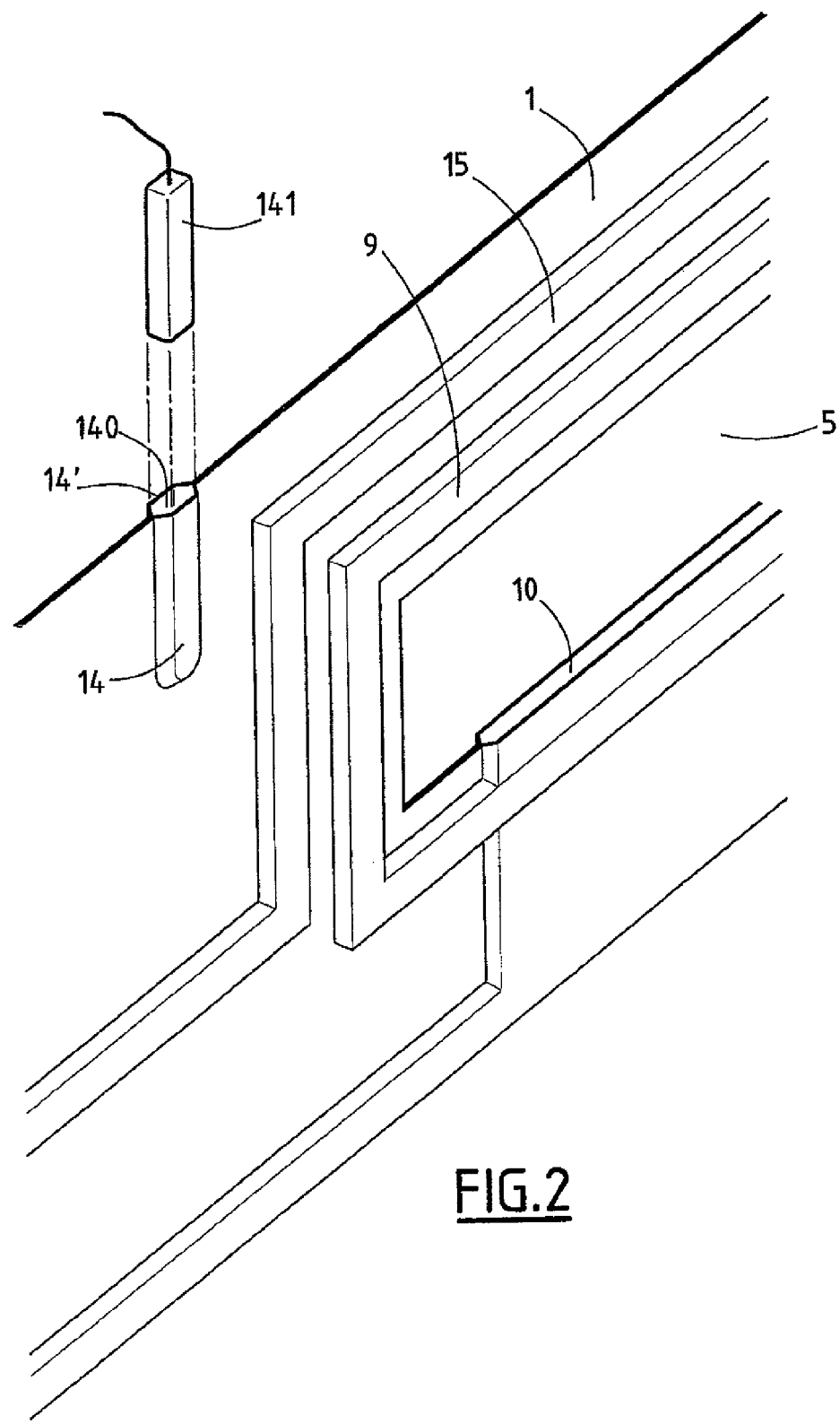

The invention will now be described in greater detail but non-limiting manner with reference to the appended Figures, in which:

FIG. 1 is a front view of a bipolar plate;
FIG. 2 is an enlarged perspective view of a bipolar plate comprising a female connector for an electrical measuring device.

The bipolar plate which is illustrated in FIG. 1 and of which only one face is visible, is constituted by a cathode or anode bipolar half-plate 1 and a bipolar half-plate which is an anode or cathode, respectively, the two half-plates being secured to each other by means of the inner faces thereof. The two half-plates are each constituted by a metal plate, for example, of stainless steel. The central portion 2 of each bipolar half-plate constitutes an active zone and comprises a network of ribs 3 which is intended to provide good distribution of the flow of the fluids on the outer surfaces of each bipolar half-plate and of the heat-exchange fluid between the two bipolar half-plates. At the peripheries thereof, the two bipolar half-plates comprise cut-outs 4, 5, 6 which are intended to form fluid units for the supply and discharge of the various fluids required for the operation of the cell.

In particular at the upper portion and the lower portion (as illustrated in the Figure), the bipolar plates comprise cut-outs 4 for the bipolar half-plate 1 and corresponding cut-outs for the second bipolar half-plate which are intended to constitute the heat-exchange fluid units. The cut-out of the upper portion is, for example, intended to form the heat-exchange fluid supply unit and the lower cut-out is intended to form the heat-exchange fluid discharge unit. On the two lateral edges, the bipolar half-plates comprise cut-outs 5 and 6 which are also generally elongate and which are intended to form, on the one hand, the supply and discharge units for the oxidant and, on the other hand, supply and discharge units for the fuel.

The cut-outs 4 which are intended to form the heat-exchange fluid units are surrounded by ribs 7 which protrude over the outer surface of each of the bipolar half-plates and which are intended to provide the sealing. On the edge thereof which is directed towards the active zone 2, the cut-outs 4 also comprise a connection 8 which allows communication between the inner side of the heat-exchange fluid units and the space which is located between the two bipolar half-plates and which is left free in the rib network. The heat-exchange fluid is intended to circulate in the space between the two bipolar half-plates. It must therefore enter via one of the heat-exchange fluid units, then circulate between the two plates and finally be discharged via a second heat-exchange fluid unit.

In the same manner, the cut-outs which are intended to form oxidant units 5 or fuel units 6 are surrounded, on the one hand, by ribs 9 and 11 which are intended to provide the sealing, respectively, and, on the other hand, by connections 10 and 12 which are intended to provide the communication respectively between the supply and discharge units for the oxidant or fuel, and the outer surfaces of the bipolar plate. The oxidants or fuels must circulate between the outer faces of the bipolar plates and the membrane/electrode assemblies which are interposed between two successive bipolar plates, the oxidant circulating over the outer face of the cathode bipolar half-plate and the fuel over the outer face of the anode bipolar half-plate.

The ribs which are intended to provide communication between the oxidant or fuel units and the outer faces of the bipolar plates are ribs which, on the one hand, open inside the oxidant or fuel units and, on the other hand, open at the other end via an opening which is provided in the adapted bipolar half-plate, one, corresponding to the oxidant, on the outer face of the cathode bipolar half-plate, and the other, corresponding to the fuel, on the outer face of the anode half-plate.

The bipolar plate comprises, at the periphery thereof, circular cut-outs which are intended to allow the passage of the fixing pins of the stack of elementary cells of the fuel cell, and small ribs 14, 14' which open only at the outer side of the bipolar plates and which form a hollow housing 140 which constitutes a female connector which is intended to receive, for example, a connector 141 of an electrical measuring device. Such connectors may be arranged at different points of the periphery of the bipolar plate and the number thereof is dependent on specific requirements.

Each of the bipolar half-plates in direct contact with each other comprises a peripheral sealing rib 15 surrounding the plurality of cut-outs, wherein the sealing rib comprises adjacent first, second and third portions along a longitudinal length of the sealing rib, wherein the first and third portions of the sealing rib are at a first distance from the outer side of the bipolar plate, and the second portion of the sealing rib is recessed toward the central portion of the bipolar plate with respect to the first and third portions of the sealing rib. The housing has an elongated shape extending from its opening along a longitudinal direction toward the second portion of the sealing rib, wherein a length of the housing is more than the first distance, so that the second portion partially surrounds the housing. The hollow housing has a female connector portion having a substantially constant transverse cross-section along the longitudinal direction of the housing, which is generally perpendicular to the outer side of the bipolar plate. The male connector extends along a longitudinal direction and has a male connector portion having a substantially constant transverse cross-section, so that the male connector portion is fittingly received in the female connector portion.

The invention claimed is:

1. Bipolar plate for a fuel cell, comprising:
   a cathode bipolar half-plate and an anode bipolar half-plate which are secured in direct contact to each other,
   each bipolar half-plate being constituted by a respective plate which comprises, in a central portion thereof, an active zone and, in a peripheral portion thereof, a plurality of cut-outs which are intended to constitute at least two oxidant units, at least two fuel units and at least two heat-exchange fluid units,
   at least one of the bipolar half-plates comprising at least one connection between one of the peripheral cut-outs and the active zone of said bipolar half-plate,
   wherein each of the bipolar half-plates comprises a peripheral sealing rib surrounding the plurality of cut-outs,
   wherein the sealing rib comprises adjacent first, second and third portions along a longitudinal direction of the sealing rib, wherein the first and third portions of the sealing rib are at a first distance from the outer side of the bipolar plate, and the second portion of the sealing rib is recessed toward the central portion of the bipolar plate with respect to the first and third portions of the sealing rib,
   wherein the bipolar plate comprises, in a peripheral portion thereof, at least one hollow housing which opens only at an outer side of the bipolar plate, wherein an opening of the housing at the outer side of the bipolar plate extends only over a portion of a periphery of the bipolar plate, wherein the housing has an elongated shape extending from the opening along a longitudinal direction toward the second portion of the sealing rib, wherein a length of the housing is more than the first distance so that the second portion of the sealing ring partially surrounds the housing,
   wherein the hollow housing has a female connector portion having a substantially constant transverse cross-section along the longitudinal direction of the housing, so that the hollow housing constitutes a female connector intended to receive a connector for electrical measurement.

2. Bipolar plate according to claim 1, wherein the hollow housing is constituted by at least one rib provided in one of the bipolar half-plates,
   wherein the at least one rib protrudes over the outer face of the bipolar half-plate and extends from a periphery of the bipolar half-plate toward the active zone of the bipolar half-plate, without reaching either the active zone or the cut-outs which are intended to form fluid units.

3. Bipolar plate according to claim 2, wherein the hollow housing is constituted by two ribs located in regard with respect to each other in the two bipolar half plates.

4. Bipolar plate according to claim 1, wherein at least one of the bipolar half-plates is a metal plate and the ribs are produced by means of drawing or stamping.

5. Bipolar plate according to claim 1, wherein at least one of the bipolar half-plates is a plate produced from charged polymer or expanded graphite and the ribs are produced by means of drawing, stamping or moulding.

6. Fuel cell comprising at least one cell which is constituted by a membrane/electrode assembly which comprises at least one bipolar plate according to claim 1.

7. Bipolar plate according to claim 2, wherein at least one of the bipolar half-plates is a metal plate and the ribs are produced by means of drawing or stamping.

8. Bipolar plate according to claim 3, wherein at least one of the bipolar half-plates is a metal plate and the ribs are produced by means of drawing or stamping.

9. Bipolar plate according to claim 2, wherein at least one of the bipolar half-plates is a plate produced from charged polymer or expanded graphite and the ribs are produced by means of drawing, stamping or moulding.

10. Bipolar plate according to claim 3, wherein at least one of the bipolar half-plates is a plate produced from charged polymer or expanded graphite and the ribs are produced by means of drawing, stamping or moulding.

11. Fuel cell comprising at least one cell which is constituted by a membrane/electrode assembly which comprises at least one bipolar plate according to claim 2.

12. Fuel cell comprising at least one cell which is constituted by a membrane/electrode assembly which comprises at least one bipolar plate according to claim 3.

13. Bipolar plate according to claim 1, wherein the opening of the housing extends only over a portion of the periphery of the bipolar plate located between two cut-outs.

14. Bipolar plate according to claim 13, comprising a plurality of housings arranged at different points of the periphery of the bipolar plate.

15. Bipolar plate according to claim 2, wherein the opening of the housing extends only over a portion of the periphery of the bipolar plate located between two cut-outs.

16. Bipolar plate according to claim 15, comprising a plurality of housings arranged at different points of the periphery of the bipolar plate.

17. Bipolar plate according to claim 3, wherein the opening of the housing extends only over a portion of the periphery of the bipolar plate located between two cut-outs.

18. Bipolar plate according to claim 17, comprising a plurality of housings arranged at different points of the periphery of the bipolar plate.

19. Bipolar plate according to claim 1, further comprising a male connector extending along a longitudinal direction and having a male connector portion having a substantially constant transverse cross-section, so that the male connector portion is fittingly received in the female connector portion.

20. Bipolar plate according to claim 19, wherein the longitudinal direction of the hollow housing is generally perpendicular to the outer side of the bipolar plate, and the longitudinal direction of the male connector is also generally perpendicular to the outer side of the bipolar plate when the male connector is received for connection in the female connector.

* * * * *